United States Patent [19]

Doerr et al.

[11] 4,381,161
[45] Apr. 26, 1983

[54] SLURRY RECOVERY FROM A CIRCULAR SUMP

[75] Inventors: Richard E. Doerr, Morgantown, W. Va.; Hilbert D. Dahl, McMurray, Pa.; Ronald W. Umphrey, Fairmont, W. Va.

[73] Assignee: Conoco Inc., Ponca City, Okla.

[21] Appl. No.: 202,550

[22] Filed: Oct. 31, 1980

[51] Int. Cl.³ .............................. B65G 53/40
[52] U.S. Cl. ................................. 406/109; 406/115
[58] Field of Search ............... 406/109, 103, 113, 115; 414/313

[56] References Cited

U.S. PATENT DOCUMENTS

| 772,957 | 10/1904 | Patterson | 414/313 X |
| 3,942,841 | 3/1976 | McCain et al. | 406/28 X |
| 3,981,541 | 9/1976 | Doerr et al. | 406/109 X |

Primary Examiner—John J. Love
Assistant Examiner—Gene A. Church
Attorney, Agent, or Firm—William J. Miller

[57] ABSTRACT

A slurry recovery sump apparatus is formed from a substantially vertical sidewall and a substantially circular horizontal cross-section and includes a bottom. A support extends diametrically across the sump and above the sump, a material input is mounted between the sidewall and the vertical axis of the sump and is attached to the support, a slurry removal apparatus is mounted to the support between the sidewall and the sump vertical axis on the opposite side from the material input. Apparatus is provided for rotating the sump support around the vertical axis and additional apparatus is provided for moving the sump removal apparatus in a prescribed manner to empty the material being deposited into the sump by the material input.

6 Claims, 5 Drawing Figures

SLURRY RECOVERY FROM A CIRCULAR SUMP

DISCUSSION OF THE PRIOR ART

Several sumps are known to the inventors which are useful for the concentration of slurries and the removal of the concentrated slurries to a remote location. For example, a patent issued to Doerr et al., U.S. Pat. No. 3,870,373, provides a sump which has an incline sufficient to gather the material being deposited at one location where it can be removed by a slurry pump.

A patent to McCain, U.S. Pat. No. 3,942,841, illustrates a vertical cylindrical sump where material is deposited in the sump which has an inlet. Material is removed from the sump at the bottom with a slurry pump.

U.S. Pat. No. 3,966,261 is a modification of the previously described patent.

U.S. Pat. No. 3,981,541 is a patent which is the closest prior art known to the inventors and does disclose a sump having material inputs spaced along the sump and a dredge removal apparatus for removing the slurry at a desired concentration. The sump is different, however, in that it is rectangular-shaped, which would not provide inner mixing of various grades of coal nor is it as simple in construction as the sump disclosed in this invention.

BRIEF DESCRIPTION OF THE INVENTION

This invention discloses a sump which is circular in horizontal cross-section and has a support extending across the sump and attached centrally at the vertical axis of the sump. Apparatus is provided for rotating the support apparatus about the vertical axis. Input is provided on one side of the support apparatus between the vertical pivot and the sidewall of the sump. The material input can include a plurality of pipes for evenly distributing the material along the radius of the sump or the material input can move horizontally along the support apparatus in any prescribed manner to fill the sump. Dredging apparatus includes a suction pump which is supported on the other half of the support apparatus and in the preferred embodiment is free to move longitudinally along the support apparatus in order to remove the material from the sump in any desired manner.

BRIEF DESCRIPTION OF THE FIGURES

FIG. 3 is a sump similar to that illustrated in FIG. 1 with a bottom which requires no longitudinal movement of the dredge;

FIG. 4 illustrates one form of adding material to the sump and reclaiming the material from the sump; and FIG. 5 illustrates another method of reclaiming material from the sump.

DETAILED DESCRIPTION OF THE INVENTION

Figure 1:
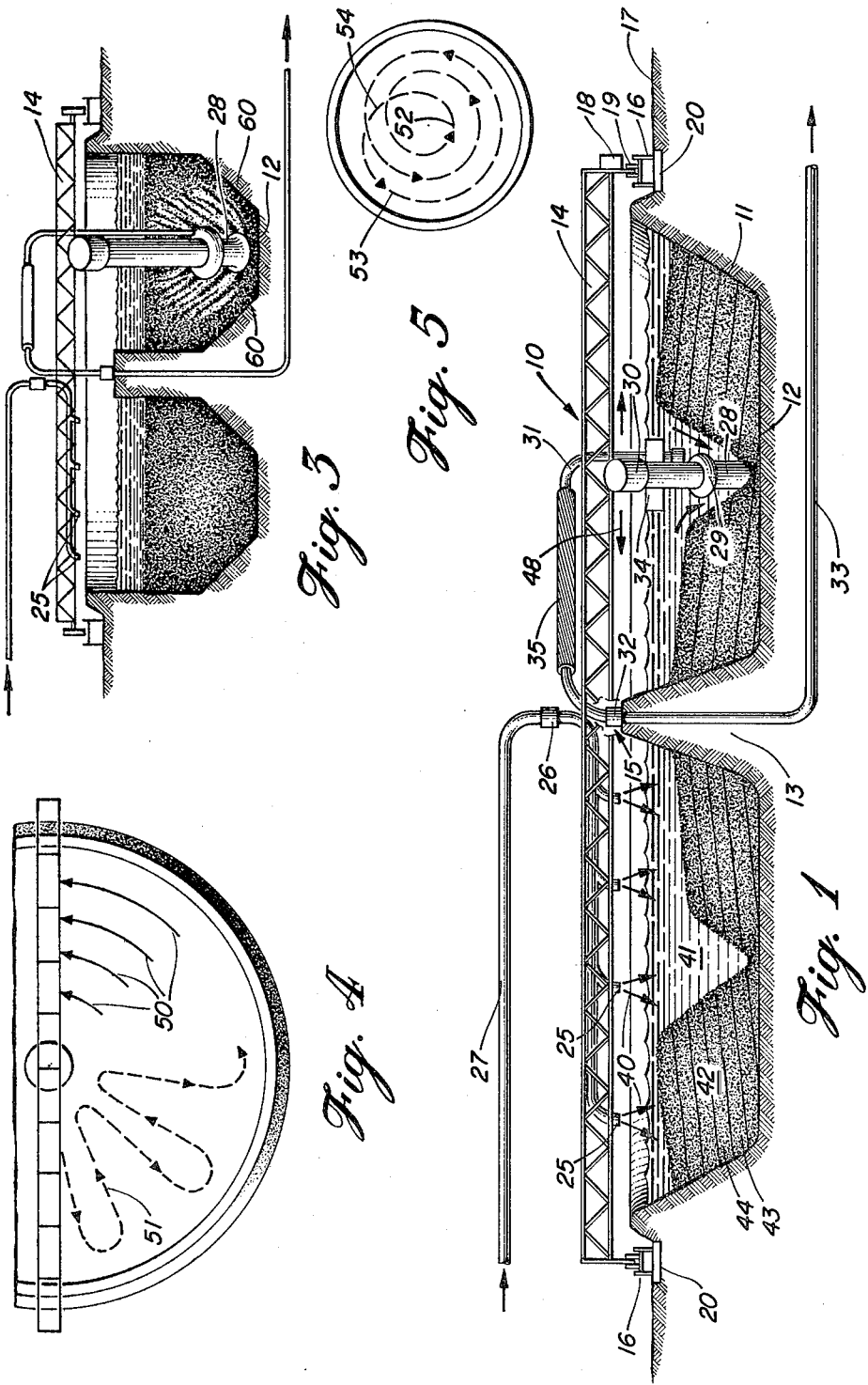
FIG. 1 is a cross-sectional view of a circular sump illustrating a method for mixing several grades of coal.
Figure 2:
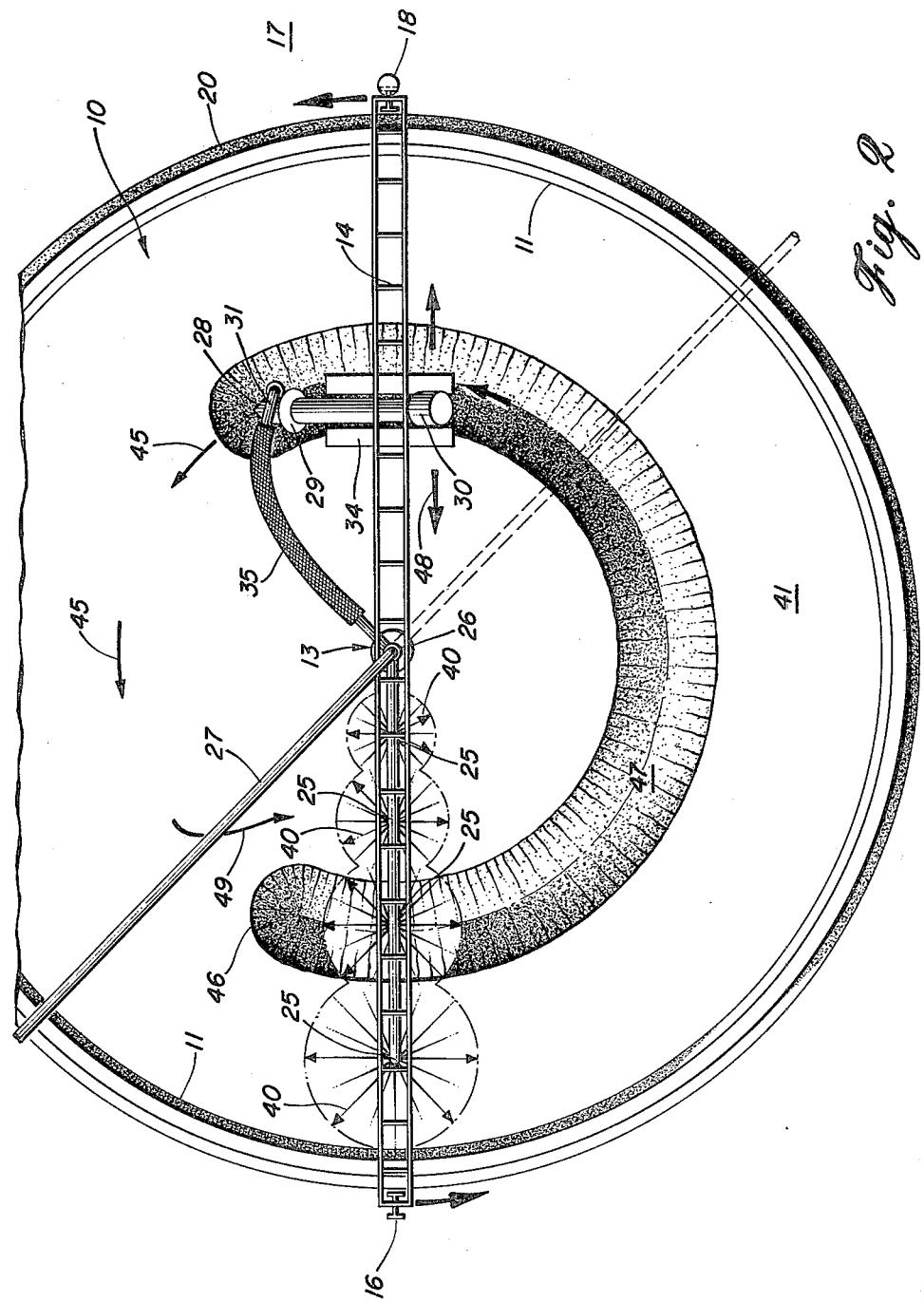
FIG. 2 is a top view of the sump shown in FIG. 1 which also illustrates one method for removing material from the sump.

Referring to all of the figures but in particular to FIGS. 1 and 2, a sump generally referred to by arrow 10 has substantially vertical sidewalls 11 which form the outer diameter of the sump, a bottom means 12 and an axial mounting structure 13. A bridge-type support structure 14 is pivotally attached at 15 to axial mount structure 13. On the outer diameter of support structure 14 are wheels 16 which permit support against the earth 17 of support structure 14 and provides movement around pivot attachment 15. A motor 18 attached through a shaft 19 to wheels 16 provides said aforementioned rotation. Other means, of course, can be utilized to rotate support structure 14, for example, a motor and gear arrangement mounted at pivot 15. A track 20 can be mounted below wheels 16 to provide a uniform surface for engagement of the wheels 16 with the earth 17. The track can be the type used in railroads, can be a circular metal plate affixed to the ground, a cement base, or any other suitable uniform surface.

Bridge support structure 14 supports a plurality of input pipes 25 which are attached through a pivotal coupler 26 to an input pipe 27. Input pipe 27 can be connected to any source of water or material but in the preferred embodiment is connected to a coal-water slurry source. The removal apparatus comprises a dredge 28 coupled to a pump 29 which is driven by a motor 30. The output from pump 29 is coupled to a pipe 31 and to a pivotal pipe coupler 32 which in turn is coupled to an output pipe 33. Output pipe 33 can be ultimately connected to any apparatus which is not illustrated in this drawing but can be, for example, a coal preparation plant. A float 34 may be secured to dredge 28 and pump 29 in order to remove some of the weight of the apparatus from bridge support structure 14. Pipe 31 can also contain floatation for pipe 31 if the pipe were laying on the surface of the water in the sump.

OPERATION

The operation of the apparatus as illustrated in FIGS. 1 and 2 is as follows:

Material enters pipe 27, passes through pivotal coupler 26 and out pipes 25 in a manner illustrated by arrows 40. The material generally comprises water 41 and a solid material such as coal 42. The coal is deposited into the sump by the sidewalls 11, axial mounting structure 13, and the bottom 12 of sump 10. The material can be run-of-the-mine material from some coal face under production or it may be from coal storage bins used for the purpose of uniformly grading the BTU or sulfur content of the coal. Under these conditions the preparation plant of a coal mine will have a storage or source consisting of high grade coal and a second storage or source consisting of lower grade coal. The coal will then be deposited in the sump in layers 43 and 44, for example, with one grade of coal being deposited as layer 43 and the next grade being deposited as layer 44 and so on. When the sump 28 is lowered into the stored material in the sump that has been deposited from inputs 25, it will remove coal through all of the layers causing a mixture of the various grades of coal. The actual pattern for removal of the coal can vary depending upon whether coal of a uniform grade is being removed, or whether a mixing feature is being employed. The prime consideration, however, is the uniform depositing of the coal from inputs 25 and the uniform removal of the coal from dredge 28.

FIGS. 2, 4, and 5 illustrate various patterns which can be used.

In FIG. 2, for example, the dredge will proceed in a circular fashion as illustrated by arrows 45 until it reaches a point near location 46. If the dredge were to continue, it would enter an area 47 where much of the coal has been removed. To prevent this, the dredge is moved in the direction of arrow 48 causing it to traverse a path 49 whereupon it will again remove coal in a circular pattern until the location is again reached where the coal has been removed.

FIG. 4 illustrates another pattern for removal where the material is deposited uniformly as illustrated by arrows 50. The dredge 28, however, takes a pattern illustrated by arrow 51. The dredge will create a uniform removal pattern following the path illustrated by arrow 51.

Another path for removal is illustrated by FIG. 5 and basically comprises a spiral. In the case of a spiral the dredge can be moved continuously from the outside wall 11 to the axial mounted structure 13 which simplifies the operation of the dredge; however, once the dredge reaches location 52, it must be returned to the original starting position 57 so a path illustrated by 54 may be traversed by the sump.

An alternate embodiment of the sump is illustrated in FIG. 3. In that sump the bottom 12, rather than being flat as illustrated in FIG. 1, has a substantially V-shape comprising sidewalls 60 with flat bottom portion 12 fairly narrow. In this arrangement the inputs 23 will distribute evenly over the sump radius and the sump 28 will remain in a fixed location at the lowest portion of the sump and then be rotated around the lowest portion of the sump. No movement longitudinal of sump 28 is necessary along support structure 14.

Material can be removed at a particular concentration by moving the pump at a controlled rate into the mixture. When the predetermined concentration is being sucked up by the pump, the movement is controlled to maintain the concentration at the predetermined amount.

A sump constructed in accordance with these teachings would have a preferred diameter as listed below.

| Capacity (tons) | Diameter (feet) | Coal Depth (feet) |
| --- | --- | --- |
| 2500 | 120 | 10 |
| 5000 | 150 | 12 |
| 7500 | 170 | 14 |
| 12500 | 200 | 17 |
| 20000 | 230 | 20 |

CONCLUSIONS

An extremely efficent sump has been disclosed which provides either an apparatus for reclaiming slurry and concentrating it to a desired mixture of water and material or an apparatus for mixing several grades or types of material in a manner to mix same to form a homogeneous slurry.

These and other changes can be made in the application and still be within the spirit and scope of the invention as disclosed in the specification and appended claims.

What we claim is:

1. A slurry recovery sump apparatus comprising:
   (a) a substantially vertical sidewall and a substantially circular horizontal cross-section defining a vertical axis;
   (b) a bottom means;
   (c) support means extending diametrically across said sump and above said sump;
   (d) material input means mounted between the sidewall and the vertical axis of said sump and mounted to and distributed along said support means;
   (e) pipe communication means connected from a remote location to said vertical axis through a pivotal coupler to said material input means;
   (f) slurry removal means having an output, said slurry removal means mounted to said support between said sidewall and said sump vertical axis and mounted to said support means on the opposite side from said material input means;
   (g) slurry transportation pipe means connected from said slurry removal means output through a pivotal coupler to a remote location; and
   (h) means for rotating said support means about the vertical axis of said sump.

2. Apparatus as described in claim 1 wherein said sump bottom means comprises sloping walls to a central depression between said vertical axis and said sidewall and wherein said slurry removal means is located substantially over said central depression.

3. Apparatus as described in claim 2 wherein said material input means is positioned over said central depression.

4. Apparatus as described in claim 1 wherein said bottom is substantially flat and wherein said material input means moves along said support means between said sidewall and said vertical axis and wherein said slurry removal means moves between said sidewall and said vertical axis.

5. Apparatus as described in claim 1 wherein bottom means is substantially flat and said material input means comprises a plurality of spaced outlets positioned along said support means between said sidewall and said vertical axis.

6. Apparatus as described in claim 1, or 4, or 5 wherein said slurry removal means comprises a suction dredging apparatus pivotally attached to said support means and float means attached to said dredging apparatus in a manner to floatably support said dredging apparatus when said sump is substantially filled with slurry.

* * * * *